(12) United States Patent
Kawahara et al.

(10) Patent No.: US 11,677,489 B2
(45) Date of Patent: Jun. 13, 2023

(54) WAVELENGTH CROSS CONNECT DEVICE, BRANCH RATIO VARIABLE METHOD, AND PROGRAM

(71) Applicant: Nippon Telegraph and Telephone Corporation, Tokyo (JP)

(72) Inventors: Hiroki Kawahara, Tokyo (JP); Takeshi Seki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 113 days.

(21) Appl. No.: 17/437,116

(22) PCT Filed: Mar. 9, 2020

(86) PCT No.: PCT/JP2020/010116
§ 371 (c)(1),
(2) Date: Sep. 8, 2021

(87) PCT Pub. No.: WO2020/189387
PCT Pub. Date: Sep. 24, 2020

(65) Prior Publication Data
US 2022/0182168 A1  Jun. 9, 2022

(30) Foreign Application Priority Data
Mar. 20, 2019 (JP) .............................. JP2019-052487

(51) Int. Cl.
*H04J 14/02* (2006.01)
*H04Q 11/00* (2006.01)

(52) U.S. Cl.
CPC ...... *H04J 14/0212* (2013.01); *H04Q 11/0003* (2013.01)

(58) Field of Classification Search
CPC .................................................. H04J 14/0212
See application file for complete search history.

(56) References Cited

U.S. PATENT DOCUMENTS

| 2011/0211836 A1* | 9/2011 | Leclair | H04J 14/0204 398/65 |
| 2016/0149664 A1* | 5/2016 | Wagener | H04J 14/0217 398/49 |

(Continued)

OTHER PUBLICATIONS

Nippon Telegraph and Telephone Corporation, "Extremely Flexible 400Gbps-class Adaptive Modulation/Demodulation Technology," NTT R & D Forum, Feb. 19, 2015, retrieved form URL <http://www.ntt.co.jp/RD/active/201502/jp/nw/pdf/N-6_j.pdf>, 3 pages (with English translation).

*Primary Examiner* — Shi K Li
(74) *Attorney, Agent, or Firm* — Fish & Richardson P.C.

(57) ABSTRACT

A large number of degrees for relays of optical signals transmitted via optical paths in the degrees is secured. A wavelength cross-connect device 20A performs a relay by splitting optical signals from respective degrees indicated by reference numerals 40*l*, 40*h*, 40*m*, 40*q*, each of the degrees being provided by optical fibers, via respective optical couplers and outputting the split optical signals to output sides of the plurality of degrees via respective WSSs 23*a* to 23*d*. As the optical couplers, variable couplers 27*a* to 27*d* whose respective splitting ratios, each of which is a ratio of optical signal power losses in splitting an optical signal, are variable are used. The wavelength cross-connect device 20A includes a control unit 26 that performs control to change the splitting ratios in such a manner as to eliminate an imbalance among OSNR margins of the output sides of the degrees in which a plurality of optical paths transmitting the split optical signals extend. The control unit 26 calculates the margins for the respective optical paths transmitting the split optical signals via the variable couplers 27*a* to 27*d*, for each of the output sides of the degrees. The control unit 26 performs control to, based on respective smallest margins of the degrees in all the margins, change the splitting ratios of (Continued)

the variable couplers 27*a* to 27*d* in such a manner as to eliminate an imbalance between the margins of the degrees.

12 Claims, 7 Drawing Sheets

(56) References Cited

U.S. PATENT DOCUMENTS

2016/0269809 A1* 9/2016 Jiang .................. H04Q 11/0005
2017/0117982 A1* 4/2017 Ji ........................ H04J 14/0212

* cited by examiner

WAVELENGTH CROSS CONNECT DEVICE, BRANCH RATIO VARIABLE METHOD, AND PROGRAM

CROSS-REFERENCE TO RELATED APPLICATIONS

This application is a National Stage application under 35 U.S.C. § 371 of International Application No. PCT/JP2020/010116, having an International Filing Date of Mar. 9, 2020, which claims priority to Japanese Application Serial No. 2019-052487, filed on Mar. 20, 2019. The disclosure of the prior application is considered part of the disclosure of this application, and is incorporated in its entirety into this application.

TECHNICAL FIELD

The present invention relates to a wavelength cross-connect device, a splitting ratio change method and a program that are used for a ROADM (reconfigurable optical add/drop multiplexer) that serves as a degree switch for an optical signal transmitted by means of any of various modulation methods such as wavelength division multiplexing in an optical network.

BACKGROUND ART

Conventionally, in designing of transmission in an optical transmission system including an optical network, relay intervals and the number of relays in optical transmission channels provided by optical fibers have been designed in such a manner that OSNR (optical signal-to-noise ratio) margins for optical signals can be secured. Also, the number of degrees (number of relays) in each ROADM node including a wavelength cross-connect device has been designed in consideration of OSNR deterioration due to loss inside the node, that is, with consideration made to ensure that the OSNR margins (also referred to as "margin(s)") each have a value that is equal to or larger than a threshold value.

If an OSNR margin is larger than 0 dB (has a positive value), which is a threshold value, optical signal transmission is possible, and if an OSNR margin is smaller than 0 dB (has a negative value), optical signal transmission is impossible. In other words, the margin is required to be 0 dB or more. As the margin is larger in proportion to a magnitude of optical signal power, the optical signal can be transmitted farther. In other words, where the margin is large, even if noise is superimposed on an optical signal in the course of transmission of the optical signal, a transmittable distance before the margin falls below 0 dB is long. Where the margin is small, noise is superimposed on an optical signal, which makes the margin fall below 0 dB at a short distance.

Inside the node, an input optical signal is split by an optical coupler and the split optical signals are output to optical paths inside optical transmission channels. Note that optical transmission channels are also referred to as "degree(s)". Inside each of the degrees, optical paths that each transmit an optical signal extend. For example, two optical signals split by an optical coupler are transmitted to respective optical paths in two different degrees. The number of splits in the optical coupler corresponds to the number of optical paths and the number of degrees.

As the number of splits in an optical coupler is larger, an amount of attenuation (loss) of the optical signal power is larger, and thus, noise is easily superimposed on the optical signals when the optical signals are transmitted in the degrees after the splitting. Therefore, where there is a need to transmit an optical path for a long distance, attenuation of optical signal power is curbed by decreasing the number of splits in the optical coupler.

FIG. 6 illustrates a network configuration of an optical transmission system 10 including wavelength cross-connect devices with optical couplers such as above mounted therein. In the optical transmission system 10, a plurality of ROADM nodes (nodes) 30 each including a wavelength cross-connect device 20 are connected via optical fibers 40, which are optical transmission channels.

Note that the ROADM nodes 30 are indicated by reference numerals 30a, 30b, 30c, 30d, 30e, 30f, 30g, 30h, 30i. Also, the optical fibers 40 are indicated by reference numerals 40a, 40b, 40c, 40d, 40e, 40f, 40g, 40h, 40i, 40j, 40k, 40l, 40m, 40n, 40o, 40p, 40q, 40r, 40s, 40t, 40u, 40v, 40w, 40x.

In the optical transmission system 10, for example, an optical path for transmission of an optical signal, which is indicated by a dashed line 51, is set to extend through node 30d from the optical fiber 40j and further extend to the optical fiber 40f through the optical fiber 40l, the node 30e, the optical fiber 40h, the node 30b, the optical fiber 40d and the node 30c.

Furthermore, the optical path indicated by a solid line 52 is set to extend from the optical fiber 40j to the optical fiber 40n through the node 30d, the optical fiber 40l, the node 30e, the optical fiber 40m and the node 30f.

Here, the optical fiber 40l is referred to as "first degree 40l", the optical fiber 40h is referred to as "second degree 40h", the optical fiber 40m is referred to as "third degree 40m" and the optical fiber 40q is referred to as "fourth degree 40q".

The wavelength cross-connect devices 20 in the respective nodes 30a to 30i have a same configuration and FIG. 7 illustrates a configuration of the wavelength cross-connect device 20 in the node 30e as a representative.

The wavelength cross-connect device 20 whose number of degrees is four includes four input-side optical amplifiers 21 connected to the first to fourth degrees 40l, 40h, 40m, 40q and four optical couplers 22a, 22b, 22c, 22d connected to the respective optical amplifiers 21. The wavelength cross-connect device 20 further includes four WSSs (wavelength-selective switches) 23a, 23b, 23c, 23d connected to the optical couplers 22a to 22d and output-side optical amplifiers 24 connected to the respective WSSs 23a to 23d. The WSSs 23a to 23d have, e.g., a wavelength-based optical signal selection function and an attenuation amount adjustment function. The optical amplifiers 24 are connected to the first to fourth degrees 40l, 40h, 40m, 40q, respectively.

Although the input-side optical couplers 22a to 22d are of a one-input, four-split output (1×4) type, as described later, an input port and an output port of a same degree are not connected to each other and each input port is connected to degrees that are different from a degree to which the input port is connected. In other words, the optical coupler 22a includes an input port connected to the first degree 40l and output ports that are not connected to the WSS 23a connected to the first degree 40l but are connected to input ports of the WSSs 23b, 23c, 23d connected to the second degree 40h, the third degree 40m and the fourth degree 40q. In this case, the optical coupler 22a splits one input into three splits and outputs the three splits. The same applies to the other optical couplers 22b to 22d.

In other words, the optical coupler 22b includes an input port connected to the second degree 40h and output ports that are not connected to the WSS 23b connected to the second degree 40h but are connected to input ports of the WSSs 23a, 23c, 23d connected to the first degree 40l, the third degree 40m and the fourth degree 40q.

The optical coupler 22c includes an input port connected to the third degree 40m and output ports that are not connected to the WSS 23c connected to the third degree 40m but are connected to input ports of the WSSs 23a, 23b, 23d connected to the first degree 40l, the second degree 40h and the fourth degree 40q.

The optical coupler 22d includes an input port connected to the fourth degree 40q and output ports that are not connected to the WSS 23d connected to the fourth degree 40q but are connected to output port of the WSSs 23a, 23b, 23c connected to the first degree 40l, the second degree 40h and the third degree 40m.

Also, in a degree between the input side of the first degree 40l and the output side of the second degree 40h, the optical path 51 indicated by a dashed line extends via the relevant optical amplifier 21, the optical coupler 22a, the WSS 23b and the relevant optical amplifier 24. Also, an optical path 52 indicated by the solid line extends in a degree between the input side of the first degree 40l and the output side of the third degree 40m via the relevant optical amplifier 21, the optical coupler 22a, the WSS 23c and the relevant optical amplifier 24. It is assumed that the optical path 51 (see FIG. 6) is a long-distance path and the optical path 52 is a short-distance path.

Where there is the long-distance optical path 51 in this way, if the number of splits in the optical coupler 22a is large, optical signal power is largely attenuated and noise is easily superimposed during transmission in the degree, resulting in failure to secure a margin for a long distance. Therefore, the number of splits in the optical coupler 22a is decreased. A design that enables long-distance transmission by reducing the number of splits to reduce an amount of attenuation of optical signal power and thereby secure a large margin as described above has been made. Examples of this type of technique include the technique described in Non-Patent Literature 1.

CITATION LIST

Non-Patent Literature

Non-Patent Literature 1: "Extremely Flexible 400 Gbps-class Adaptive Modulation/Demodulation Technology", [online], NTT R&D Forum 2015, [searched on Mar. 7, 2019], Internet <URL: http://www.ntt.co.jp/RD/active/201502/jp/nw/pdf/N-6_j.pdf>

SUMMARY OF THE INVENTION

Technical Problem

In the aforementioned wavelength cross-connect device 20, where there is the long-distance optical path 51 in one of degrees split in the optical coupler 22a, it is necessary to reduce the number of degrees in order to secure a margin for fulfilling the long distance. If the number of splits in an optical coupler is large, an amount of attenuation (loss) of optical signal power after splitting is large, resulting in a decrease in power of the optical signal. Thus, margins of the degrees corresponding to the number of splits become small, which makes long-distance transmission impossible. Therefore, long-distance transmission is enabled by decreasing the number of splits.

Where there is an imbalance in distance among optical paths, the number of degrees is designed in such a manner as to be capable of securing margins of the degrees in conformity to a longest-distance optical path. In other words, in the wavelength cross-connect device 20, which serves as a relay node, a worst-case design that limits the number of degrees in conformity to a longest optical path has been made. In this case, there is a problem in that a large number of degrees cannot be provided.

The present invention has been made in view of such circumstances as above and an object of the present invention is provide a wavelength cross-connect device, a splitting ratio change method and a program that enable securing a large number of degrees for relays of optical signals transmitted via optical paths in the degrees.

Means for Solving the Problem

As means for achieving the object, the invention according to claim 1 provides a wavelength cross-connect device for performing a relay by splitting optical signals transmitted from input sides of a plurality of degrees each provided by optical fibers, via respective optical couplers and outputting the split optical signals to output sides of the plurality of degrees via respective WSSs (wavelength selective switches), wherein: as each of the optical couplers, a variable splitting-ratio coupler whose splitting ratio that is a ratio of optical signal power losses in splitting an optical signal is variable is used; the wavelength cross-connect device includes a control unit that performs control to change the splitting ratios of the variable splitting-ratio couplers in such a manner as to eliminate an imbalance between optical signal-to-noise ratio margins of the output sides of the degrees in which a plurality of optical paths transmitting the respective optical signals subsequent to the splitting extend; and the control unit calculates the margins for the respective optical paths on the output side, for each of the degrees, and performs control to, based on respective smallest margins of the degrees, the smallest margins being obtained from all the calculated margins, change the splitting ratios of the variable splitting-ratio couplers in such a manner as to eliminate an imbalance between the margins of the degrees.

The invention according to claim 5 provides a splitting ratio change method for a wavelength cross-connect device for performing a relay by splitting optical signals transmitted from input sides of a plurality of degrees each provided by optical fibers, via respective optical couplers and outputting the split optical signals to output sides of the plurality of degrees via respective WSSs, the wavelength cross-connect device using a variable splitting-ratio coupler whose splitting ratio that is a ratio of optical signal power losses in splitting an optical signal is variable is used, as each of the optical couplers, the wavelength cross-connect device including a control unit that performs control to change the splitting ratios of the variable splitting-ratio couplers in such a manner as to eliminate an imbalance between optical signal-to-noise ratio margins of the output sides of the degrees in which a plurality of optical paths transmitting the respective optical signals subsequent to the splitting extend, the method including causing the control unit to perform: a step of calculating the respective margins for the plurality of optical paths transmitting the optical signals subsequent to the splitting via the variable splitting-ratio couplers, for the output sides of the respective degrees; and a step of performing control to, based on respective smallest margins of the degrees, the smallest margins being obtained from all the margins calculated for the output sides of the respective degrees, change the splitting ratios of the variable splitting-ratio couplers in such a manner as to eliminate an imbalance between the margins of the degrees.

The invention according to claim 6 provides a program for making a computer that is a wavelength cross-connect device that performs a relay by splitting optical signals transmitted from a plurality of degrees each provided by optical fibers, via respective optical couplers and outputting the split optical signals to output sides of the plurality of degrees via respective WSSs, uses a variable splitting-ratio coupler whose splitting ratio that is a ratio of optical signal power losses in splitting an optical signal is variable, as each of the optical couplers, and performs control to change the splitting ratios of the variable splitting-ratio couplers in such a manner as to eliminate an imbalance between optical signal-to-noise ratio margins of the output sides of the degrees in which a plurality of optical paths transmitting the respective optical signals subsequent to the splitting extend, function as: means for calculating the respective margins for the plurality of optical paths transmitting the optical signals subsequent to the splitting via the variable splitting-ratio couplers, for the output sides of the respective degrees; and means for performing control to, based on respective smallest margins of the degrees, the smallest margins being obtained from all the margins calculated for the output sides of the respective degrees, change the splitting ratios of the variable splitting-ratio couplers in such a manner as to eliminate an imbalance between the margins of the degrees.

The configuration of claim 1, the method of claim 5 and the program of claim 6 enable an imbalance between the margins of all the degrees on the output sides of the wavelength cross-connect device to be eliminating by changing the splitting ratios, each of which is a ratio of optical signal power losses in splitting an optical signal via the relevant variable splitting-ratio coupler. Therefore, a worst-case design that limits the number of degrees in conformity to a longest one of the optical paths extending in the degrees can be avoided. Accordingly, the number of splits in the variable splitting-ratio couplers can be increased, enabling securing a large number of degrees.

The invention according to claim 2 is the wavelength cross-connect device according to claim 1, wherein the control unit performs control to determine the splitting ratios of the variable splitting-ratio couplers in such a manner that each of the margins of the output sides of the degrees is close or equal to an average value of the smallest margins of the degrees.

This configuration enables the splitting ratios of the variable splitting-ratio couplers to be determined based on an average value of the smallest margins of the degrees in such a manner as to eliminate an imbalance between the margins of all the degrees on the output side.

The invention according to claim 3 provides the wavelength cross-connect device according to claim 1 or 2, wherein: first WSSs that each provides N outputs from one input that is an optical signal are connected to the input sides of the respective degrees and first variable splitting-ratio couplers that each split one input into M splits, M being smaller than N, are cascade-connected to each of the connected first WSSs for the respective degrees; and second variable splitting-ratio couplers that each provide one output by combining M inputs are connected to M output ports of each of the cascade-connected first variable splitting-ratio couplers, and second WSSs that each integrate output ports of relevant second variable splitting-ratio couplers of the connected second variable splitting-ratio couplers into one output and provide the respective one outputs to the output sides of the respective degrees are cascade-connected to the respective relevant second variable splitting-ratio couplers.

According to this configuration, each of the input ports to which the input sides of the degrees of the wavelength cross-connect device are connected is increased to N ports by a relevant first WSS and first variable splitting-ratio couplers are connected to each N ports to split an optical signal into M splits, M being smaller than N, and thus, no large optical signal attenuation occurs. On the output side, also, the split optical signals are combined using the M×1 second variable splitting-ratio couplers, M×1 being opposite to that of the input side, and then, the combined signals are integrated into one optical signal by each second WSS and the respective one optical signals are output to the output sides of the degrees, and thus, the optical signals can be output in the form of the optical signals when the optical signals were input. Therefore, the number of input ports to which the input sides of the degrees of the wavelength cross-connect device are connected and the number of output ports to which the output sides of the degrees are connected can be increased in such a manner as to cause no large optical signal attenuation.

The invention according to claim 4 provides the wavelength cross-connect device according to claim 1 or 2, wherein: first variable splitting-ratio couplers that each split one input that is an optical signal into M splits are connected to the input sides of the respective degrees, and first WSSs that each provide N outputs from one input are cascade-connected to each of the connected first variable splitting-ratio couplers for the respective degrees; and second WSSs that each provide one output from N inputs are connected to output ports of the cascade-connected first WSSs and second variable splitting-ratio couplers that each combine M output ports of relevant second WSSs of the connected second WSSs into one output and provide the respective one outputs to the output sides of the respective degrees are cascade-connected to the respective relevant second WSSs.

According to this configuration, each of the input ports to which the input sides of the degrees of the wavelength cross-connect device are connected is split into M ports by a relevant first variable splitting-ratio coupler. The split count of M is a number of splits that causes no large optical signal attenuation. A first WSS is connected to each of the M ports corresponding to the M splits to output N optical signals, N being larger than M. Subsequently, on the output side, also, one optical signal is output by each of N×1 second WSSs, N×1 being opposite to that of the input side, and each second variable splitting-ratio coupler to which M such optical signal are input combines the M optical signals into one optical signal and output the one optical signal to the output side of a relevant one of the degrees. Therefore, each of the optical signals can be output in the form of the optical signal when the optical signal was input. Accordingly, the number of input ports to which the input sides of the degrees of the wavelength cross-connect device are connected and the number of output ports to which the output sides of the degrees are connected can be increased in such a manner as to cause no large optical signal attenuation.

Effects of the Invention

The present invention enables provision of a wavelength cross-connect device, a splitting ratio change method and a program that secure a large number of degrees for relays of optical signals transmitted via optical paths in the degrees.

DESCRIPTION OF EMBODIMENTS

Figure 1:
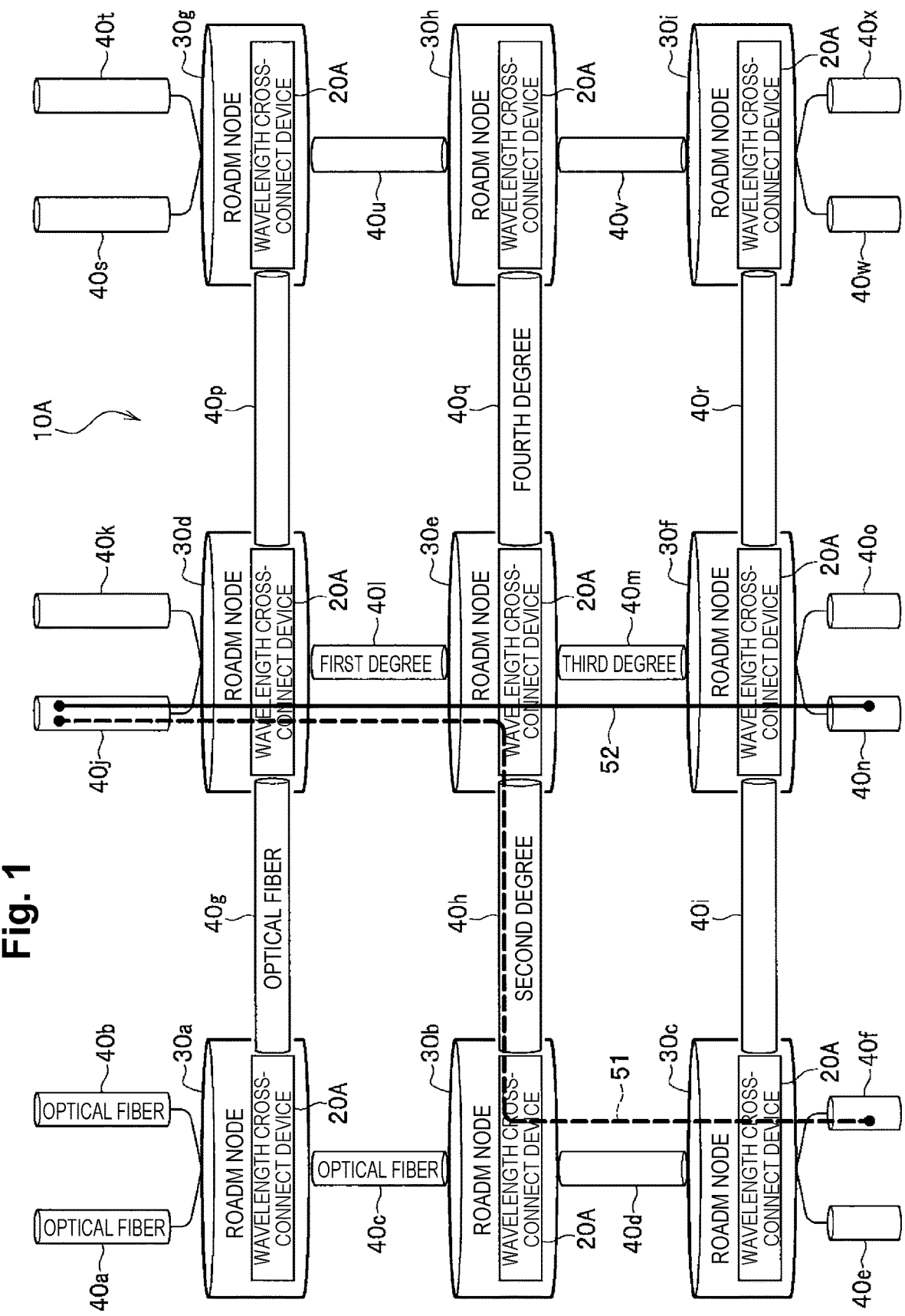
FIG. 1 is a block diagram of a network configuration of an optical transmission system according to an embodiment of the present invention.

An embodiment of the present invention will be described below with reference to the drawings. Note that in all of the drawings, component parts corresponding to one another in function are provided with a same reference numeral and description thereof will appropriately be omitted.

Configuration of Embodiment

FIG. 1 is a block diagram illustrating a network configuration of an optical transmission system according to an embodiment of the present invention.

Figure 2:
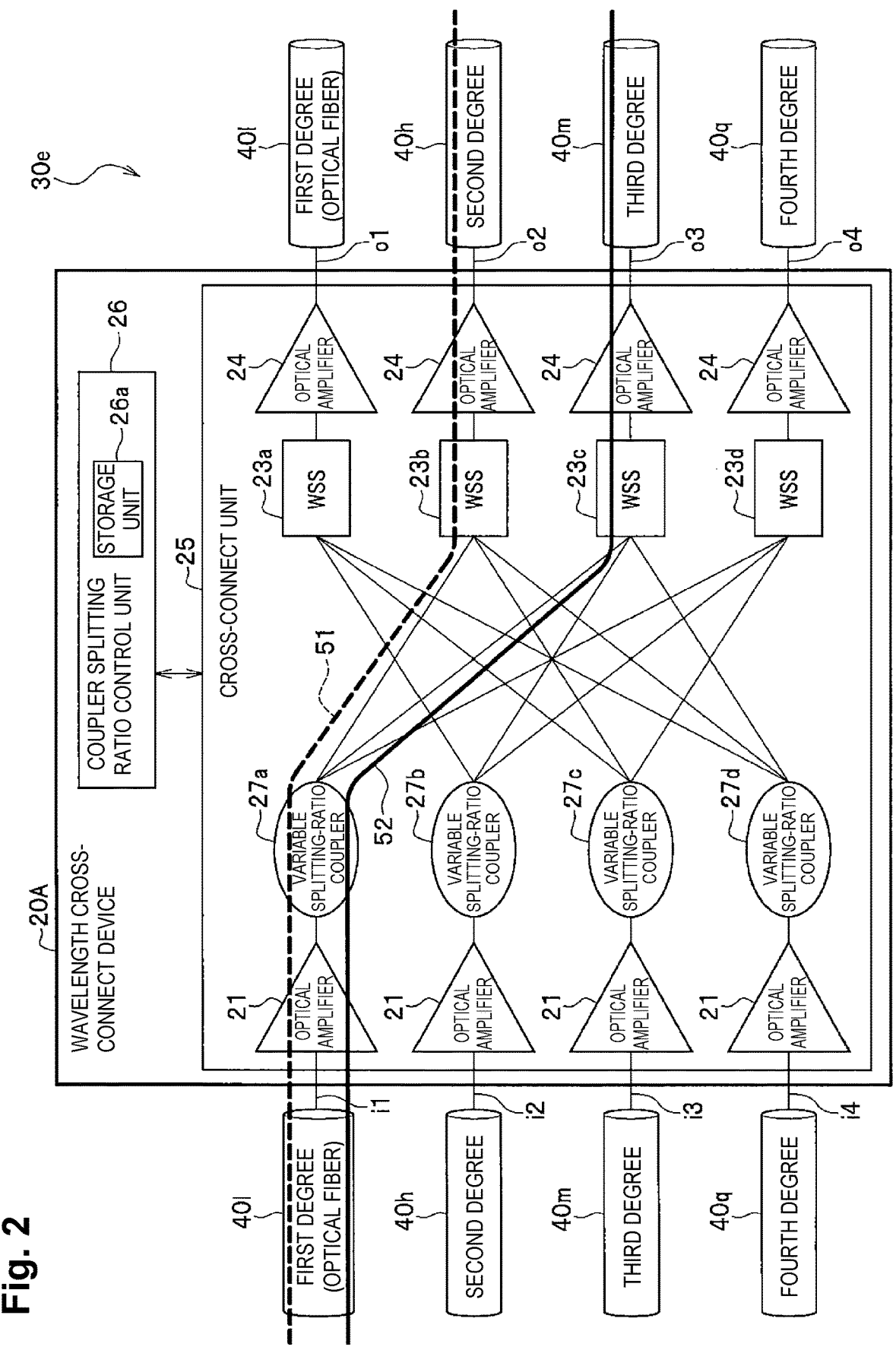
FIG. 2 is a block diagram illustrating a configuration of a wavelength cross-connect device in the optical transmission system according to the present embodiment.
Figure 6:
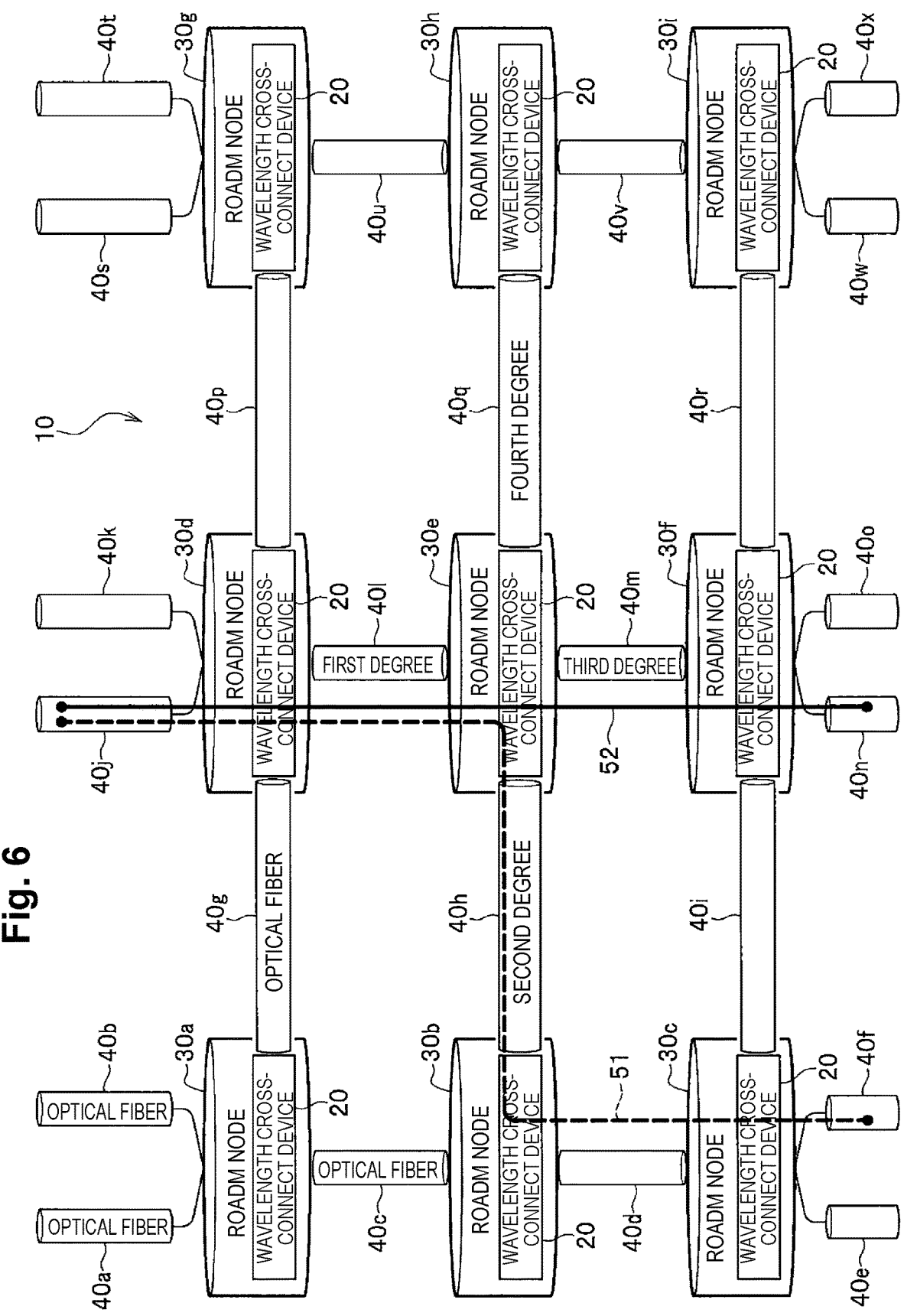
FIG. 6 is a block diagram illustrating a network configuration of a conventional optical transmission system.
Figure 7:
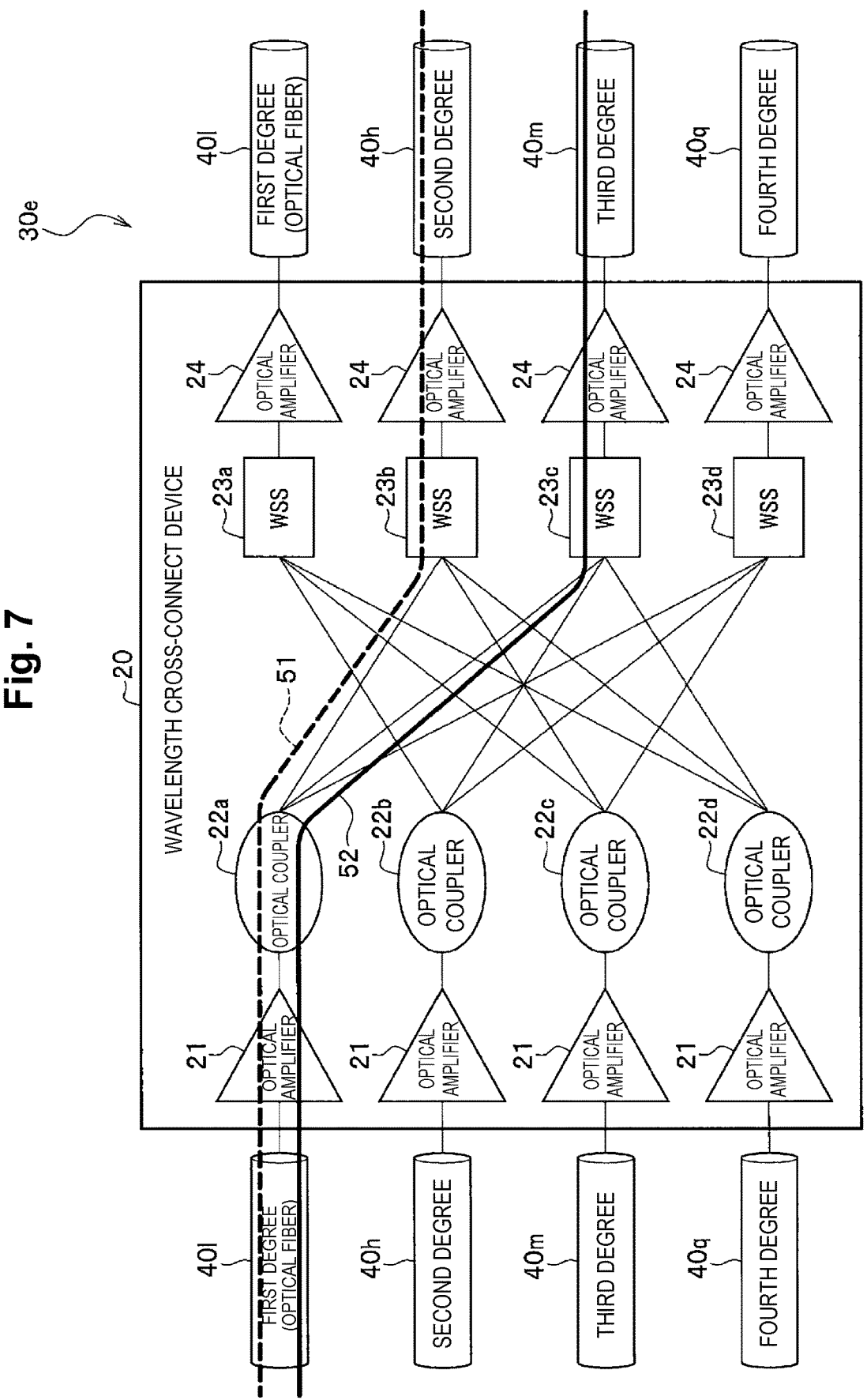
FIG. 7 is a block diagram illustrating a configuration of a wavelength cross-connect device in the conventional optical transmission system.

As illustrated in FIG. 2, a difference of an optical transmission system 10A, which is illustrated in FIG. 1, from the conventional optical transmission system 10 (FIG. 6) lies in that each wavelength cross-connect device 20A includes a cross-connect unit 25 and a coupler splitting ratio control unit (also referred to as "control unit") 26. FIG. 2 is a block diagram illustrating a configuration of a wavelength cross-connect device 20A in a node 30e that is a representative of nodes 30a to 30i in the optical transmission system 10A.

Differences of the wavelength cross-connect device 20A from the conventional wavelength cross-connect device 20 (FIG. 6) lie in inclusion of variable splitting-ratio couplers (also referred to as "variable coupler(s)") 27a, 27b, 27c, 27d whose respective splitting ratios, each of which is a ratio of optical signal power losses in splitting an optical signal, are variable in the cross-connect unit 25, instead of the conventional optical couplers 22a to 22d. The differences also lie in that the control unit 26 performs control to change the splitting ratios of the variable couplers 27a to 27d in such a manner as to eliminate an imbalance among OSNR margins of respective optical paths.

Here, ordinary optical couplers have the following characteristics. For example, in the case of an optical coupler that splits one input into two splits with equal loss, optical signal powers resulting from an optical signal of 100% being split into two splits with equal loss of 50% are output. In other words, the optical coupler splits an optical signal into two splits at a ratio at which half of the optical signal is lost equally (losses of 1:1). In this 1×2 optical coupler, a loss on each side is $10 \times \log_{10}$ (N−1) dB and each of both sides has a loss of 3 dB.

In a variable splitting-ratio coupler, for example, a splitting ratio in an optical signal with optical signal power of 100% is split into two splits can be set to 2:3, and in this case, attenuation amounts (losses) of optical signal powers are 40%:60%. This means that as the splitting ratio is larger, a loss of optical signal power becomes larger.

Each of the variable splitting-ratio coupler 27a to 27d of the present embodiment is of a 1×4 type and can change losses in the splitting ratio. In the present example, as described later, the variable splitting-ratio couplers 27a to 27d are used to split one input into three splits. For example, three split optical signals in three optical paths can be output, for example, with respective losses of 1:2:3. Such control to change losses in the splitting ratio (splitting ratio change control) as above is performed by the control unit 26.

The control unit 26 performs control to change respective splitting ratios of the variable couplers 27a to 27d in such a manner as to eliminate an imbalance among OSNR margins for optical paths.

In the cross-connect unit 25, an input end of an input-side optical amplifier 21 to which a first degree 40l is connected is an input port i1, an input end of an input-side optical amplifier 21 to which a second degree 40h is connected is an input port i2, an input end of an input-side optical amplifier 21 to which a third degree 40m is connected is an input port i3, and an input end of an input-side optical amplifier 21 to which a fourth degree 40q is connected is an input port i4.

Also, an output end of an output-side optical amplifier 24 to which the first degree 40l is connected is an output port o1, an output end of an output-side optical amplifier 24 to which the second degree 40h is connected is an output port o2, an output end of an output-side optical amplifier 24 to which the third degree 40m is connected is an output port o3, and an output end of an output-side optical amplifier 24 to which the fourth degree 40q is connected is an output port o4.

In the cross-connect unit 25, an input port (for example, the input port i1) and an output port (for example, the first output port o1) of a same degree are not connected via an optical path. Therefore, an input port (for example, the first input port i1) and the second to fourth output ports o2 to o4 that are different from the first input port i1 are connected via respective optical paths.

In other words, the variable coupler 27a is connected to the first input port i1 to which the first degree 40l is connected, via the relevant optical amplifier 21 on the input side. Also, the variable coupler 27a is not connected to a WSS 23a linked to the first degree 40l but is connected to respective input ends of WSSs 23b, 23c, 23d linked to the second degree 40h, third degree 40m and fourth degree 40q, respectively, on the output side. In this case, the variable coupler 27a splits one input into three splits and outputs the three splits.

The variable coupler 27b linked to the second degree 40h is not connected to the WSS 23b linked to the output side of the second degree 40h but is connected to respective input ends of the WSSs 23a, 23c, 23d linked to the first degree 40l, the third degree 40m and the fourth degree 40q, respectively.

The variable coupler 27c linked to the third degree 40m is not connected to the WSS 23c linked to the output side of the third degree 40m but is connected to the respective input ends of the WSSs 23a, 23b, 23d linked to the first degree 40l, the second degree 40h and the fourth degree 40q, respectively.

The variable coupler 27d linked to the fourth degree 40q is not connected to the WSS 23d linked to the output side of the fourth degree 40q but is connected to the respective input ends of the WSSs 23a, 23b, 23c linked to the first degree 40l, the second degree 40h and the third degree 40m, respectively.

With such connection as above, on the output side, three optical paths split in the three variable couplers 27b to 27d extend to the first degree 40l via the WSS 23a and the relevant optical amplifier 24. Three optical paths split in the three variable couplers 27a, 27c, 27d extend to the second degree 40h via the WSS 23b and the relevant optical amplifier 24. Three optical paths split in the three variable couplers 27a, 27b, 27d extend to the third degree 40m via the WSS 23c and the relevant optical amplifier 24. Three optical paths split in the three variable couplers 27a to 27c extend to the fourth degree 40q via the WSS 23d and the relevant optical amplifier 24.

Also, in a degree between the input side of the first degree 40l and the output side of the second degree 40h, an optical path 51 (see FIG. 1) indicated by a dashed line extends via the relevant optical amplifier 21, the variable coupler 27a, the WSS 23b and the relevant optical amplifier 24. Also, in a degree between the input side of the first degree 40l and the output side of the third degree 40m, an optical path 52 (see FIG. 1) indicated by a solid line extends via the relevant optical amplifier 21, variable coupler 27a, the WSS 23c and the relevant optical amplifier 24.

<Operation of Splitting Ratio Change Control>

Splitting ratio change control of the variable couplers 27a to 27d by the control unit 26 in the wavelength cross-connect device 20A having the above configuration will be described with reference to the flowchart illustrated in FIG. 3.

However, as described above, three optical paths p1 to p3 split in relevant ones of the variable couplers 27a to 27d extend on the output side of each of the degrees 40l, 40h, 40m, 40q.

Figure 3:
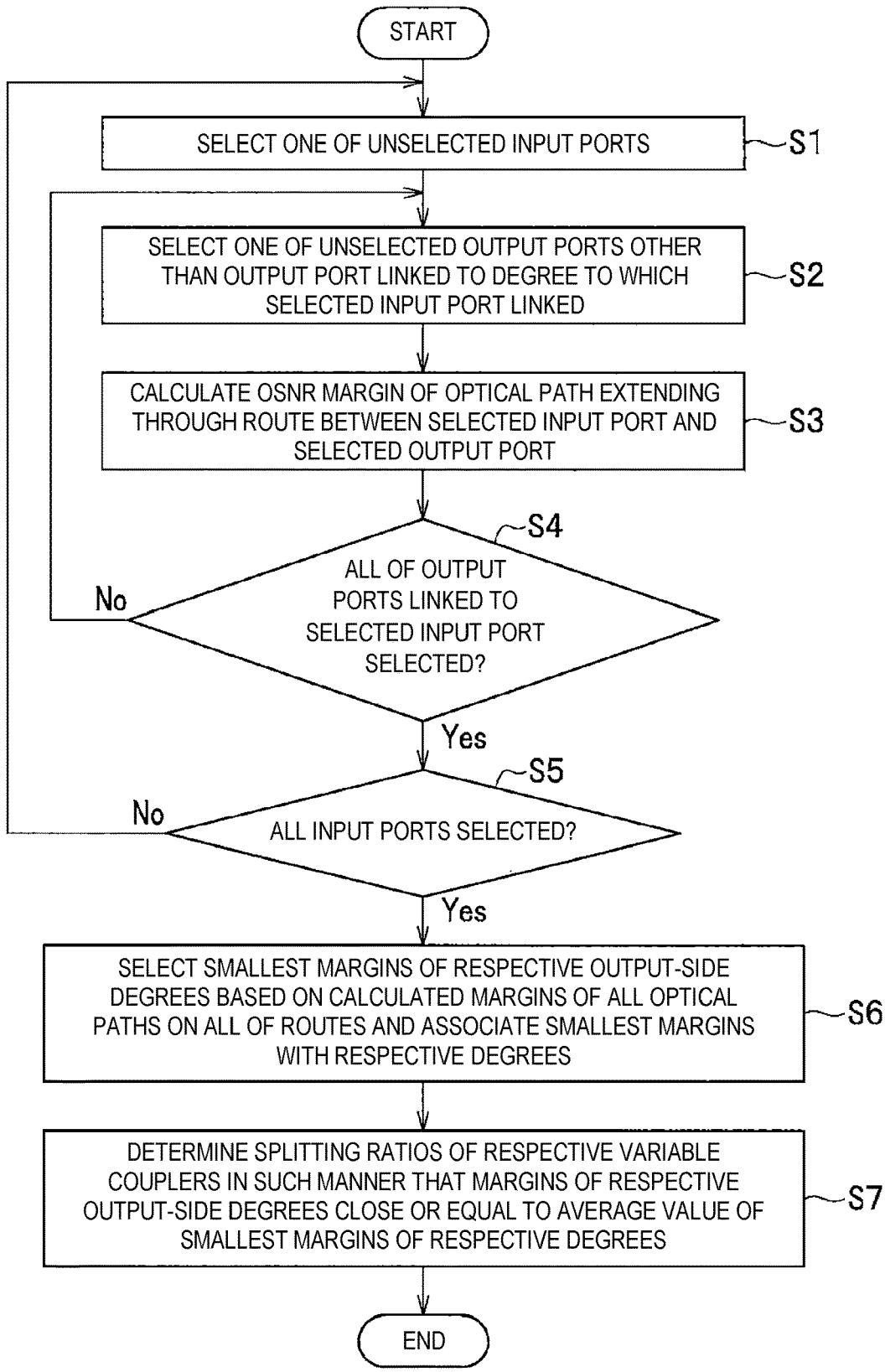
FIG. 3 is a flowchart for describing operation of splitting ratio change control by a coupler splitting ratio control unit in the wavelength cross-connect device according to the present embodiment.

In step S1 illustrated in FIG. 3, the control unit 26 selects one of unselected input ports i1 to i4 according to a predetermined order. For example, the input port i1 is selected.

In step S2, the control unit 26 selects one of unselected output ports o2 to o4 other than an output port of linked to the first degree 40l linked to the selected input port i1, according to a predetermined order. For example, the output port o2 is selected.

In step S3, the control unit 26 calculates an OSNR margin for the optical path p1 extending in a route between the selected input port i1 and the selected output port o2 and stores the calculated margin for the optical path p1 in the storage unit 26a.

In step S4, the control unit 26 determines whether or not all of the output ports o2 to o4 linked to the selected input port i1 have been selected. As a result, if not all of the output ports have been selected (No), the control unit 26 returns to step S2 above, selects the next output port o2 and performs the processing in step S3.

If a result of the determination in step S4 above is that all of the output ports have been selected (Yes), in step S5, the control unit 26 determines whether or not all of the input ports i1 to i4 have been selected. If a result of the determination is that not all of the input ports have been selected (No), the control unit 26 returns to the processing in step S1 above, selects the next input port i2 and performs the processing in steps S2 to S4.

If a result of the determination in step S5 above is that all of the input ports have been selected (Yes), in step S6, the control unit 26 reads margins for all the optical paths p1 to p3 in all of routes between the input ports i1 to i4 and the output ports o1 to o4, which have been calculated in step S3 above, from the storage unit 26a. The control unit 26 selects respective smallest margins of the output sides of the first to fourth degrees 40l, 40h, 40m, 40q from all the margins read, associate the selected smallest margins with the respective degrees 40l, 40h, 40m, 40q and stores the associations in the storage unit 26a.

For example, if the margin for the optical path p1 (optical path 52) is smallest in the margins for all the optical paths p1 to p3 extending through the output-side third degree 40m, the control unit 26 selects the smallest margin, associates the margin with the output side of the third degree 40m and stores the association in the storage unit 26a.

Next, in step S7, the control unit 26 reads the smallest margins of all of the degrees 40l, 40h, 40m, 40q from the storage unit 26a and determines respective splitting ratios of the variable couplers 27a to 27d in such a manner that the margins of the output sides of the degrees 40l, 40h, 40m, 40q are close or equal to an average value of all the smallest margins.

In other words, the control unit 26 determines the splitting ratios of the three variable couplers 27b to 27d in such a manner that the margin of the first degree 40l is close or equal to the average value on the output side. The control unit 26 determines the splitting ratios of the three variable couplers 27a, 27c, 27d in such a manner that the margin of the second degree 40h is close or equal to the average value. The control unit 26 determines the splitting ratios of the three variable couplers variable couplers 27a, 27b, 27d in such a manner that the margin of the third degree 40m is close or equal to the average value. The control unit 26 determines the splitting ratios of the three variable couplers variable couplers 27a to 27c in such a manner that the margin of the fourth degree 40q is close or equal to the average value.

In other words, in order to determine a ratio of losses in respective split optical signals, the control unit 26 determines respective splitting ratios, that is, respective ratios of losses in relevant three variable couplers of the variable couplers 27a to 27d in such a manner that the margins of the first to fourth degrees 40l, 40h, 40m, 40q are close or equal to the average value. Note that for processing for determining the splitting ratios, other statistical calculation processing may be used other than the processing using an average value.

Effects of Embodiment

A wavelength cross-connect device 20A according to the embodiment performs a relay by splitting optical signals transmitted from a plurality of degrees 40l, 40h, 40m, 40q each provided by optical fibers, via respective optical couplers and outputting the split optical signals to the output sides of the plurality of degrees 40l, 40h, 40m, 40q via WSSs 23a to 23d, respectively. The wavelength cross-connect device 20A has the following features and configurations.

(1) As the optical couplers, variable couplers 27a to 27d whose respective splitting ratios, each of which is a ratio of optical signal power losses in splitting an optical signal, are variable are used. The wavelength cross-connect device 20A includes a control unit 26 that performs control to change the splitting ratios of the variable couplers 27a to 27d in such a manner as to eliminate an imbalance among optical signal-to-noise ratio margins of the output sides of the degrees 40l, 40*h*, 40*m*, 40*q* in which a plurality of optical paths transmitting respective optical signals subsequent to splitting extend.

The control unit 26 calculates respective margins for a plurality of optical paths transmitting optical signals subsequent to splitting in the variable couplers 27*a* to 27*d*, for each of the output sides of the degrees 40*l*, 40*h*, 40*m*, 40*q*. Based on respective smallest margins of the degrees 40*l*, 40*h*, 40*m*, 40*q*, which are obtained from all the calculated margins, the control unit 26 performs control to change the splitting ratios of the variable couplers 27*a* to 27*d* in such a manner as to eliminate an imbalance among the margins of the degrees 40*l*, 40*h*, 40*m*, 40*q*.

This configuration enables the splitting ratios, each of which is a ratio of optical signal power losses in splitting an optical signal, to be changed by the variable couplers 27*a* to 27*d* and thus enables an imbalance among margins of all the degrees 40*l*, 40*h*, 40*m*, 40*q* on the output side of the wavelength cross-connect device 20A to be eliminated. Therefore, a worst-case design that limits the number of degrees in conformity to a longest one of the optical paths extending in the degrees 40*l*, 40*h*, 40*m*, 40*q* can be avoided. Accordingly, the number of splits in the variable couplers 27*a* to 27*d* can be increased, enabling securing a large number of degrees.

(2) The control unit 26 is configured to perform control to determine the splitting ratios of the variable couplers 27*a* to 27*d* in such a manner that the margins of the output sides of the degrees 40*l*, 40*h*, 40*m*, 40*q* are close or equal to an average value of the respective smallest margins of the degrees 40*l*, 40*h*, 40*m*, 40*q*.

This configuration enables the splitting ratios of the variable couplers 27*a* to 27*d* to be determined based on the average value of the respective smallest margins of the degrees 40*l*, 40*h*, 40*m*, 40*q* in such a manner as to eliminate an imbalance among the margins of all the degrees 40*l*, 40*h*, 40*m*, 40*q* on the output side.

Alteration 1 of Embodiment

Figure 4:
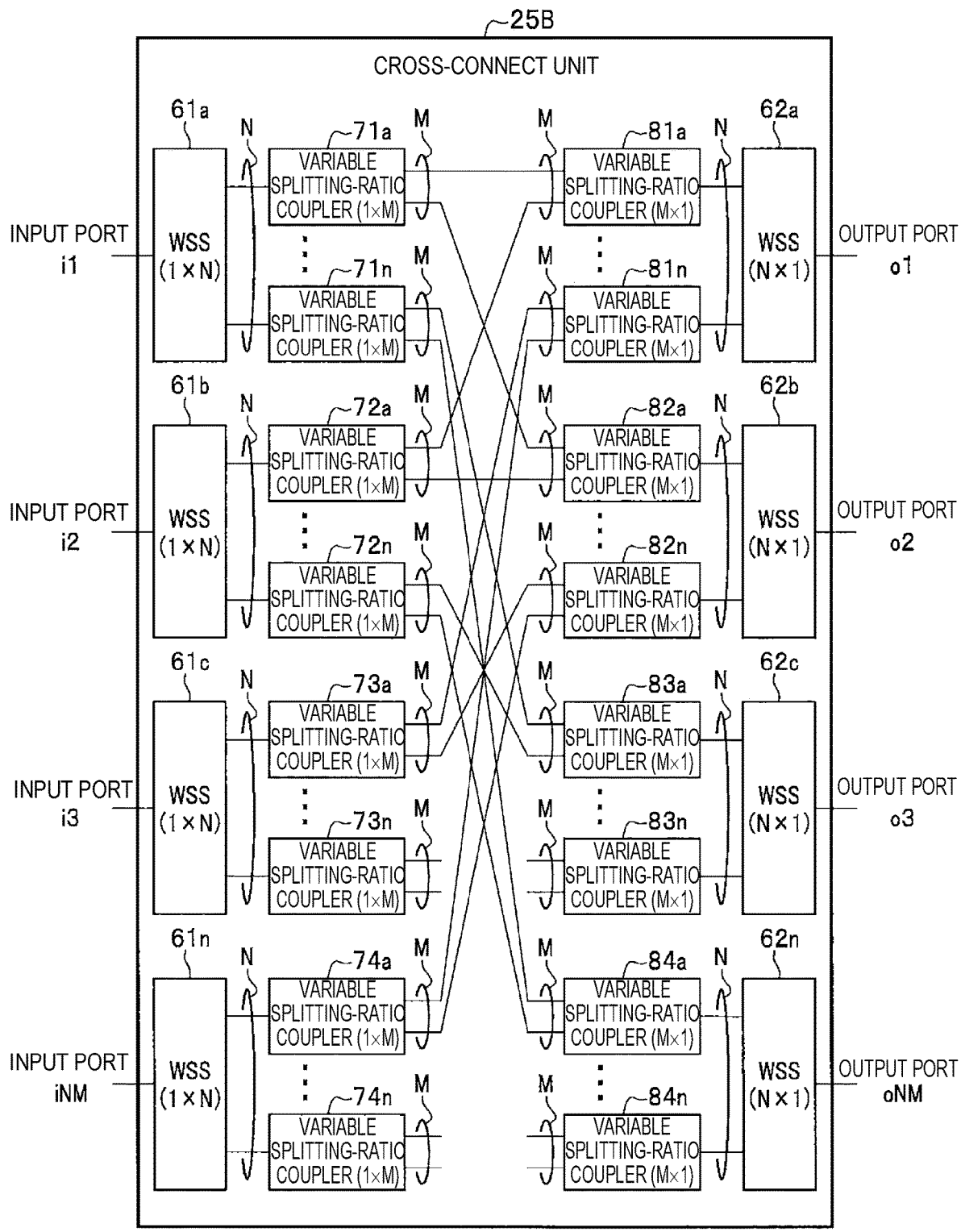
FIG. 4 is a block diagram illustrating a configuration of a cross-connect unit in a wavelength cross-connect device according to alteration 1 of the embodiment of the present invention.

FIG. 4 is a block diagram illustrating a configuration of a cross-connect unit 25B according to alteration 1 of the present embodiment.

Differences of the cross-connect unit 25B of alteration 1 from the above-described cross-connect unit 25 (FIG. 2) lie in that on the input side, 1×N WSSs (first WSSs) 61*a* to 61*n* and N 1×M variable splitting-ratio couplers (first variable splitting-ratio couplers) 71*a* to 71*n*, 72*a* to 72*n*, 73*a* to 73*n*, 74*a* to 74*n* (71*a* to 74*n*) are cascade-connected. The differences also lie in that on the output side, N M×1 variable splitting-ratio couplers (second variable splitting-ratio couplers) 81*a* to 81*n*, 82*a* to 82*n*, 83*a* to 83*n*, 84*a* to 84*n* (81*a* to 84*n*) and N×1 WSSs (second WSSs) 62*a* to 62*n* are cascade-connected. Here, a relationship of N>M is provided. Also, illustration of optical amplifiers 21 on the input port i1 to i4 side and optical amplifiers 24 on the output port o1 to o4 side, which are illustrated in FIG. 2, is omitted.

In the cross-connect unit 25 illustrated in FIG. 2, where the number of input ports i1 to i4 and the number of output ports o1 to o4 are increased, if the number of input ports and output ports added is large, the number of output ports of each of the input-side variable couplers 27*a* to 27*d* increases and optical signals largely attenuate because of the increase.

Therefore, as in the configuration of the cross-connect unit 25B illustrated in FIG. 4, the 1×N WSSs 61*a* to 61*n* are connected to the respective input ports i1 to iNM to increase each of the input ports i1 to i4 to N ports. Relevant ones of the variable couplers 71*a* to 74*n* are cascade-connected to each N ports.

In this connection configuration, even though the input port i1 is increased into N ports by the WSS 61*a*, the variable couplers 71*a* to 71*n* are connected to the N ports, respectively, and the respective variable couplers 71*a* to 71*n* each split an optical signal into M splits, M being smaller than N, which cause no large optical signal attenuation. In other words, optical signal attenuation is curbed. This applies to the other WSSs 61*b* to 61*n* and the other variable couplers 72*a* to 74*n*.

Since the M×1 variable splitting-ratio couplers 81*a* to 84*n* are connected to the input-side variable couplers 71*a* to 71*n*, optical signals split by the variable couplers 71*a* to 71*n* are combined by the variable splitting-ratio couplers 81*a* to 84*n*. The combined optical signals can be integrated by the N×1 WSSs 62*a* to 62*n* and output to the respective output ports o1 to oNM.

According to this configuration, each of the input ports to which the input sides of the degrees 40*l*, 40*h*, 40*m*, 40*q* of the cross-connect unit 25B are connected is increased to N ports by a relevant first WSS and first variable splitting-ratio couplers are connected to each N ports to split an optical signal into M splits, M being smaller than N, and thus, no large optical signal attenuation occurs.

Subsequently, on the output side, also, the split optical signals are combined using M×1 second variable splitting-ratio couplers, M×1 being opposite to that of the input side, and then the combined signals are integrated into one optical signal by each second WSS and the respective one optical signals are output to the output sides of the degrees 40*l*, 40*h*, 40*m*, 40*q*, and thus, the optical signals can be output in the form of the optical signals when the optical signals were input. Therefore, the number of input ports to which the input sides of the degrees 40*l*, 40*h*, 40*m*, 40*q* of the wavelength cross-connect device are connected and the number of output ports to which the output sides of the degrees 40*l*, 40*h*, 40*m*, 40*q* are connected can be increased in such a manner as to cause no large optical signal attenuation.

Alteration 2 of Embodiment

Figure 5:
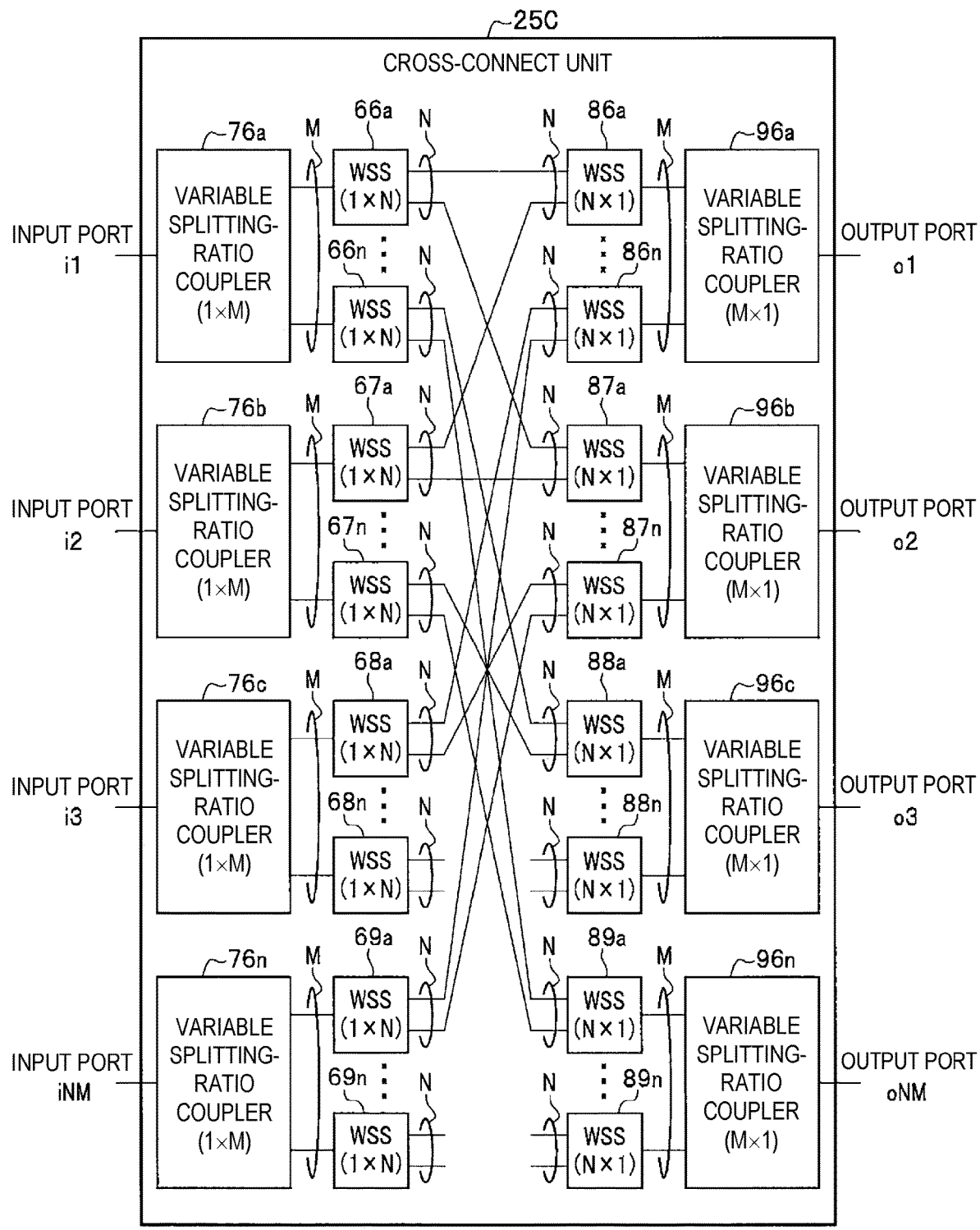
FIG. 5 is a block diagram illustrating a configuration of a cross-connect unit in a wavelength cross-connect device according to alteration 2 of the embodiment of the present invention.

FIG. 5 is a block diagram illustrating a configuration of a cross-connect unit 25C according to alteration 2 of the present embodiment.

The cross-connect unit 25C of alteration 2 is different from the above-described cross-connect unit 25B (FIG. 4) in that on the input side and the output side, WSSs and variable splitting-ratio couplers are cascade-connected in respective orders opposite to those of the cross-connect unit 25B.

In other words, 1×M variable couplers (first variable splitting-ratio couplers) 76*a* to 76*n* are connected to respective input ports i1 to iNM and 1×N WSSs (first WSSs) 66*a* to 66*n*, 67*a* to 67*n*, 68*a* to 68*n*, 69*a* to 69*n* (66*a* to 69*n*) are connected to respective variable couplers 76*a* to 76*n*. In other words, M optical signals, M being a number of splits that cause no large attenuation, are output from each of the variable couplers 76*a* to 76*n*, and each of the M split optical signals is increased to N optical signals by a relevant one of the WSSs 66*a* to 69*n* and the N optical signals are output.

On the output side, M×1 variable couplers (second variable splitting-ratio couplers) 96*a* to 96*n* are cascade-connected to N×1 WSSs (second WSSs) 86*a* to 86*n*, 87*a* to 87*n*, 88*a* to 88*n*, 89*a* to 89*n* (86*a* to 89*n*), respectively, N×1 being opposite to that on the output side, to restore optical signals to their respective original optical signals and the original optical signals are output to respective degrees 40*l*, 40*h*, 40*m*, 40*q*.

According to this configuration, each of the input ports to which the input sides of the degrees 40*l*, 40*h*, 40*m*, 40*q* of the cross-connect unit 25C are connected is split into M ports by a relevant first variable splitting-ratio coupler. The split count of M is a number of splits that causes no large optical signal attenuation. A first WSS is connected to each of the M ports corresponding to the M splits to output N optical signals, N being larger than M.

Subsequently, on the output side, also, one optical signal is output by each of N×1 second WSSs, N×1 being opposite to that of the input side, and each second variable splitting-ratio coupler to which M such optical signals are input combines the M optical signals into one optical signal and outputs the one optical signal to the output side of a relevant one of the degrees 40*l*, 40*h*, 40*m*, 40*q*. Therefore, each of the optical signals can be output in the form of the optical signal when the optical signal was input. Accordingly, the number of input ports to which the input sides of the degrees 40*l*, 40*h*, 40*m*, 40*q* of the wavelength cross-connect device are connected and the number of output ports to which the output sides of the degrees 40*l*, 40*h*, 40*m*, 40*q* are connected can be increased in such a manner as to cause no large optical signal attenuation.

Also, a program according to the present embodiment, which is to be executed by a computer, will be described. The computer is a wavelength cross-connect device 20A that performs a relay by splitting optical signals transmitted from a plurality of degrees each provided by optical fibers, via respective optical couplers and outputting the split optical signals to the output sides of the plurality of degrees via WSSs, respectively, and uses variable splitting-ratio couplers whose respective splitting ratios, each of which is a ratio of optical signal power losses in splitting an optical signal, are variable as each of the optical couplers and performs control to change the splitting ratios of the variable couplers 27*a* to 27*d* in such a manner as to eliminate an imbalance among optical signal-to-noise ratio margins of the output sides of the degrees 40*l*, 40*h*, 40*m*, 40*q* in which a plurality of optical paths transmitting the respective optical signals subsequent to the splitting extend.

The above program makes the computer function as means for calculating the respective margins for the plurality of optical paths transmitting the respective optical signals subsequent to the splitting via the variable couplers 27*a* to 27*d*, for each of the output sides of the respective degrees 40*l*, 40*h*, 40*m*, 40*q*. The program also makes the computer function as means for performing control to, based on respective smallest margins of the output sides of the degrees 40*l*, 40*h*, 40*m*, 40*q*, which are obtained from all the margins calculated for the output sides of the degrees 40*l*, 40*h*, 40*m*, 40*q*, change the splitting ratios of the variable couplers 27*a* to 27*d* in such a manner as to eliminate an imbalance among the margins of the degrees 40*l*, 40*h*, 40*m*, 40*q*.

This program enables provision of effects that are similar to those of the wavelength cross-connect device 20A according to the above-described embodiment.

In addition, the specific configurations of the present embodiment and the alterations thereof can appropriately be changed without departing from the spirit of the present invention.

REFERENCE SIGNS LIST 10A optical transmission system
20A wavelength cross-connect device
21, 24 optical amplifier
23*a* to 23*d*, 61*a* to 61*n*, 62*a* to 62*n*, 66*a* to 69*n*, 86*a* to 89*n* WSS
25, 25B, 25C cross-connect unit
26 coupler splitting ratio change control unit
26*a* storage unit
27*a* to 27*d*, 71*a* to 74*n*, 81*a* to 84*n*, 76*a* to 76*n*, 96*a* to 96*n* variable splitting-ratio coupler
30, 30*a* to 30*i* ROADM node
40, 40*a* to 40*x* optical fiber
40*l* first degree
40*h* second degree
40*m* third degree
40*q* fourth degree
51, 52 optical path
i1 to i4 input port
o1 to o4 output port

The invention claimed is:

1. A wavelength cross-connect device for performing a relay by splitting optical signals transmitted from input sides of a plurality of degrees each provided by optical fibers, via respective optical couplers and outputting the split optical signals to output sides of the plurality of degrees via respective WSSs (wavelength selective switches), wherein:

as each of the optical couplers, a variable splitting-ratio coupler whose splitting ratio that is a ratio of optical signal power losses in splitting an optical signal is variable is used;

the wavelength cross-connect device includes a control unit that includes one or more processors and configured to perform control to change the splitting ratios of the variable splitting-ratio couplers in such a manner as to eliminate an imbalance between optical signal-to-noise ratio margins of the output sides of the degrees in which a plurality of optical paths transmitting the respective optical signals subsequent to the splitting extend; and the control unit is configured to calculate the margins for the respective optical paths on the output side, for each of the degrees, and perform control to, based on respective smallest margins of the degrees, the smallest margins being obtained from all the calculated margins, change the splitting ratios of the variable splitting-ratio couplers in such a manner as to eliminate an imbalance between the margins of the degrees.

2. The wavelength cross-connect device according to claim 1, wherein the control unit is configured to perform control to determine the splitting ratios of the variable splitting-ratio couplers in such a manner that each of the margins of the output sides of the degrees is close or equal to an average value of the smallest margins of the degrees.

3. The wavelength cross-connect device according to claim 1, wherein:

first WSSs configured to provide N outputs from one input that is an optical signal are connected to the input sides of the respective degrees and first variable splitting-ratio couplers that each split one input into M splits, M being smaller than N, are cascade-connected to each of the connected first WSSs for the respective degrees; and second variable splitting-ratio couplers configured to provide one output by combining M inputs are connected to M output ports of each of the cascade-connected first variable splitting-ratio couplers, and second WSSs that each configured to integrate output ports of relevant second variable splitting-ratio couplers of the connected second variable splitting-ratio couplers into one output and provide the respective one outputs to the output sides of the respective degrees are cascade-connected to the respective relevant second variable splitting-ratio couplers.

4. The wavelength cross-connect device according to claim 1, wherein:
first variable splitting-ratio couplers that each configured to split one input that is an optical signal into M splits are connected to the input sides of the respective degrees, and first WSSs that each configured to provide N outputs from one input are cascade-connected to each of the connected first variable splitting-ratio couplers for the respective degrees; and
second WSSs configured to provide one output from N inputs are connected to output ports of the cascade-connected first WSSs and second variable splitting-ratio couplers configured to combine M output ports of relevant second WSSs of the connected second WSSs into one output and provide the respective one outputs to the output sides of the respective degrees are cascade-connected to the respective relevant second WSSs.

5. A splitting ratio change method for a wavelength cross-connect device for performing a relay by splitting optical signals transmitted from input sides of a plurality of degrees each provided by optical fibers, via respective optical couplers and outputting the split optical signals to output sides of the plurality of degrees via respective WSSs,
the wavelength cross-connect device using a variable splitting-ratio coupler whose splitting ratio that is a ratio of optical signal power losses in splitting an optical signal is variable is used, as each of the optical couplers,
the wavelength cross-connect device including a control unit that performs control to change the splitting ratios of the variable splitting-ratio couplers in such a manner as to eliminate an imbalance between optical signal-to-noise ratio margins of the output sides of the degrees in which a plurality of optical paths transmitting the respective optical signals subsequent to the splitting extend,
the method comprising causing the control unit to perform:
a step of calculating the respective margins for the plurality of optical paths transmitting the optical signals subsequent to the splitting via the variable splitting-ratio couplers, for the output sides of the respective degrees; and
a step of performing control to, based on respective smallest margins of the degrees, the smallest margins being obtained from all the margins calculated for the output sides of the respective degrees, change the splitting ratios of the variable splitting-ratio couplers in such a manner as to eliminate an imbalance between the margins of the degrees.

6. The splitting ratio change method according to claim 5, wherein the control unit is configured to perform control to determine the splitting ratios of the variable splitting-ratio couplers in such a manner that each of the margins of the output sides of the degrees is close or equal to an average value of the smallest margins of the degrees.

7. The splitting ratio change method according to claim 5, wherein:
first WSSs configured to provide N outputs from one input that is an optical signal are connected to the input sides of the respective degrees and first variable splitting-ratio couplers that each split one input into M splits, M being smaller than N, are cascade-connected to each of the connected first WSSs for the respective degrees; and
second variable splitting-ratio couplers configured to provide one output by combining M inputs are connected to M output ports of each of the cascade-connected first variable splitting-ratio couplers, and second WSSs that each configured to integrate output ports of relevant second variable splitting-ratio couplers of the connected second variable splitting-ratio couplers into one output and provide the respective one outputs to the output sides of the respective degrees are cascade-connected to the respective relevant second variable splitting-ratio couplers.

8. The splitting ratio change method according to claim 5, wherein:
first variable splitting-ratio couplers configured to split one input that is an optical signal into M splits are connected to the input sides of the respective degrees, and first WSSs that each configured to provide N outputs from one input are cascade-connected to each of the connected first variable splitting-ratio couplers for the respective degrees; and
second WSSs configured to provide one output from N inputs are connected to output ports of the cascade-connected first WSSs and second variable splitting-ratio couplers that each configured to combine M output ports of relevant second WSSs of the connected second WSSs into one output and provide the respective one outputs to the output sides of the respective degrees are cascade-connected to the respective relevant second WSSs.

9. A non-transitory computer readable medium storing a program for making a computer that is a wavelength cross-connect device that performs a relay by splitting optical signals transmitted from a plurality of degrees each provided by optical fibers, via respective optical couplers and outputting the split optical signals to output sides of the plurality of degrees via respective WSSs, uses a variable splitting-ratio coupler whose splitting ratio that is a ratio of optical signal power losses in splitting an optical signal is variable, as each of the optical couplers, and performs control to change the splitting ratios of the variable splitting-ratio couplers in such a manner as to eliminate an imbalance between optical signal-to-noise ratio margins of the output sides of the degrees in which a plurality of optical paths transmitting the respective optical signals subsequent to the splitting extend, function as:
means for calculating the respective margins for the plurality of optical paths transmitting the optical signals subsequent to the splitting via the variable splitting-ratio couplers, for the output sides of the respective degrees; and
means for performing control to, based on respective smallest margins of the degrees, the smallest margins being obtained from all the margins calculated for the output sides of the respective degrees, change the splitting ratios of the variable splitting-ratio couplers in such a manner as to eliminate an imbalance between the margins of the degrees.

10. The non-transitory computer readable medium according to claim 9, wherein the control unit is configured to perform control to determine the splitting ratios of the variable splitting-ratio couplers in such a manner that each of the margins of the output sides of the degrees is close or equal to an average value of the smallest margins of the degrees.

11. The non-transitory computer readable medium according to claim 9, wherein:
first WSSs configured to provide N outputs from one input that is an optical signal are connected to the input sides of the respective degrees and first variable splitting-ratio couplers that each split one input into M splits, M being smaller than N, are cascade-connected to each of the connected first WSSs for the respective degrees; and
second variable splitting-ratio couplers configured to provide one output by combining M inputs are connected to M output ports of each of the cascade-connected first variable splitting-ratio couplers, and second WSSs that each configured to integrate output ports of relevant second variable splitting-ratio couplers of the connected second variable splitting-ratio couplers into one output and provide the respective one outputs to the output sides of the respective degrees are cascade-connected to the respective relevant second variable splitting-ratio couplers.

12. The non-transitory computer readable medium according to claim 9, wherein:
first variable splitting-ratio couplers configured to split one input that is an optical signal into M splits are connected to the input sides of the respective degrees, and first WSSs that each configured to provide N outputs from one input are cascade-connected to each of the connected first variable splitting-ratio couplers for the respective degrees; and
second WSSs configured to provide one output from N inputs are connected to output ports of the cascade-connected first WSSs and second variable splitting-ratio couplers that each configured to combine M output ports of relevant second WSSs of the connected second WSSs into one output and provide the respective one outputs to the output sides of the respective degrees are cascade-connected to the respective relevant second WSSs.

* * * * *